United States Patent [19]
Sorensen et al.

[11] 3,782,072
[45] Jan. 1, 1974

[54] APPARATUS FOR WRAPPING ARTICLES

[75] Inventors: Robert P. Sorensen; Leo Strombeck, both of Rockford, Ill.

[73] Assignee: Anderson Bros. Mfg. Co., Rockford, Ill.

[22] Filed: Aug. 31, 1972

[21] Appl. No.: 285,491

[52] U.S. Cl. .................... 53/229, 53/182, 156/515
[51] Int. Cl. .................... B65b 11/08, B65b 9/02
[58] Field of Search ............... 53/33, 182, 229; 156/251, 515, 582; 219/244

[56] References Cited
UNITED STATES PATENTS

| | | | |
|---|---|---|---|
| 3,188,782 | 6/1965 | Lapides | 53/229 |
| 3,453,801 | 7/1969 | Stohlquist | 53/33 |
| 3,522,135 | 7/1970 | Page | 53/182 X |
| 3,553,059 | 1/1971 | Stohlquist | 156/515 |
| 3,727,365 | 4/1973 | Stohlquist | 53/229 X |

Primary Examiner—Robert L. Spruill
Attorney—Vernon J. Pillote

[57] ABSTRACT

An apparatus for wrapping articles of the type wherein articles are advanced along an article path into a curtain of heat sealable wrapping material, and upper and lower jaw assemblies are sequentially moved laterally of the article path into positions at the trail side of the article to clamp overlapping portions of the web therebetween, and then forwardly along the article path in a sealing run. The lower jaw assemblies each include a pair of spaced clamping jaw members having a jaw opening therebetween, and a rotary heat sealing and cutting member is mounted for movement into and out of the jaw opening as the jaw assemblies move past a zone intermediate the ends of the sealing run, to sever and seal overlapping portions of the webs.

14 Claims, 7 Drawing Figures

APPARATUS FOR WRAPPING ARTICLES

BACKGROUND OF THE INVENTION

The present invention relates to improvements in apparatus of the type disclosed in the U.S. Patent to Roger H. Stohlquist No. 3,453,801, assigned to the assignee of the present invention, and wherein articles are wrapped in heat sealable wrapping material as they are advanced along an article path. In the apparatus disclosed in the above-mentioned patent, upper and lower webs of heat sealable wrapping material are joined together to form a curtain of material extending crosswise of an article path, and articles are advanced through the curtain to draw the wrapping material along the lead and along the top and bottom sides of the article. Upper and lower jaw assemblies supported by upper and lower endless conveyors are sequentially moved laterally of the article path into positions adjacent the trail side of the article and then forwardly along the article path in clamping engagement with the overlapping webs of material in a sealing run. In that apparatus, the jaw assemblies have spaced clamping jaws for clamping overlapping portions of the webs therebetween as they move along the sealing run, and one of the jaw assemblies has an electrically energized heat sealing and cutting element mounted thereon to sever the overlapping portions of the web between the clamping jaws and to seal the overlapping portions of the web at each side of the line of severance.

While such apparatus operates to sever and seal overlapping portions of the webs while the articles are in motion, some problems were encountered in achieving uniformly satisfactory wrapping of articles when that wrapping apparatus was operated at speeds above 12 to 15 per minute. In order to effect a satisfactory seal between the webs, it is not only necessary to heat the webs thereacross sufficient to melt the same, but it is also necessary to allow the sealed ends of the web to cool sufficient to provide adequate strength before stresses are applied to the sealed joint between the webs. When the heat sealing and cutting elements are mounted on the clamping jaw assemblies that hold the overlapping portions of the webs together, the heat from the sealing and cutting element tends to cause heating of the clamping jaws and this adversely affects cooling of the heat sealed joints between the webs. In order to reduce heating of the clamping jaws, the aforementioned apparatus utilized impulse-type heat sealing and cutting elements on the jaw assemblies and energized the impulse-type sealing and cutting elements during only a portion of the sealing run. However, there is a time lag after energization of the impulse-type sealing element before its temperature builds up sufficient to sever and seal the webs and there is also a time lag after deenergization of the impulse sealing element before it cools below the softening temperature of the heat sealable webs and this also contributes to limiting the speed at which the apparatus can be operated. Moreover, since the impulse-type sealing and cutting elements are in the form of a thin resistance-type wire or ribbon, some problem is encountered in achieving uniform heating and sealing along the length of the sealing wire. In addition, mounting of the sealing and cutting element on the clamping jaws also complicates the mechanism for applying and controlling the application of electrical power to the heat sealing and cutting element.

SUMMARY OF THE INVENTION

The above problems of the prior wrapping apparatus are overcome by the present invention in which the heat sealing and cutting element is mounted on a separate carrier for movement into and out of the clamping jaw assemblies during only a small portion of their cycle time.

As in the previous apparatus, articles, comprising either single items or groups of items, are advanced along a path into a curtain of material that extends crosswise of the path to draw the material along the lead side and along the top and bottom of the articles, and upper and lower clamping jaws mounted on endless conveyors, are sequentially moved laterally of the article path into a position at the trail side of the article and then forwardly along the article path in a sealing run with overlapping portions of the webs clamped therebetween. In accordance with the present invention, the lower jaw assembly has a pair of clamping jaw members spaced apart in a direction lengthwise of the article path to provide a jaw opening therebetween, and a heat sealing and cutting member is mounted for movement in a closed loop course extending generally tangent to the sealing run at a zone intermediate the ends of the sealing run sequentially into the jaw opening in the lower jaw assembly as it moves past the intermediate zone to sever and seal overlapping portions of the upper and lower web at opposite sides of the line of severance, and then out of the lower jaw opening before the upper and lower jaw assemblies reach the end of the sealing run to allow the sealed webs to cool.

The heat sealing and cutting member is advantageously supported on a shaft for rotation in the closed loop course, and the sealing and cutting member is preferably yieldably supported so as to remain generally tangent to the sealing run during a small but finite portion of its path of movement. Since the heat sealing and cutting member extends into the jaw assemblies during only a small portion of the overall cycle time, heating of the clamping jaw assemblies is minimized. This allows relatively rapid cooling of the sealed webs. Moreover, with this arrangement, the sealing and cutting member can be continuously energized and have a relatively large mass to maintain a substantially uniform temperature during the web severing and sealing operation, without causing detrimental heating of the clamping jaw assemblies.

These, together with other features and advantages of the present invention will become apparent from the following description when taken in connection with the accompanying drawings wherein:

The apparatus of the present invention is generally adapted for wrapping articles in heat sealable wrapping materials. As used herein, the term "articles" includes single items as well as groups of items. The heat sealable wrapping material is a thermoplastic film and may, for example, comprise polyethylene, polyvinyl chloride, etc. The thermoplastic films are preferably of the so-called heat shrinkable type, to enable heat shrinking of the wrapper into tight conformity with the article, after the article has been wrapped.

The wrapping apparatus is generally of the type disclosed in the aforementioned U.S. Patent to Roger H. Stohlquist No. 3,453,801, and the disclosure in that patent is hereby incorporated by reference. In general, upper and lower webs of heat sealable wrapping material $W_1$ and $W_2$ are supplied as from rolls $R_1$ and $R_2$. The roll $R_1$ is supported on a frame member and is passed under a web tensioning roller 15 and over guide rollers 16 and 17 through a web tensioning and retracting apparatus such as a vacuum box 18 and over an upper guide roller 19 which supports the web $W_1$ above the article path. The web $W_2$ from the roll $R_2$ is passed under a web tensioning roller 21 and through a web retracting apparatus shown in FIG. 1 as comprising spaced guide rollers 23 and 24 and an intermediate dancer roll 25, the guide roll 24 supporting the lower web $W_2$ at a level below the article path. The upper and lower webs $W_1$ and $W_2$ are joined by a joint or weld indicated at X in FIG. 2 to form a certain extending crosswise of the path of advance of the articles.

Figure 2:
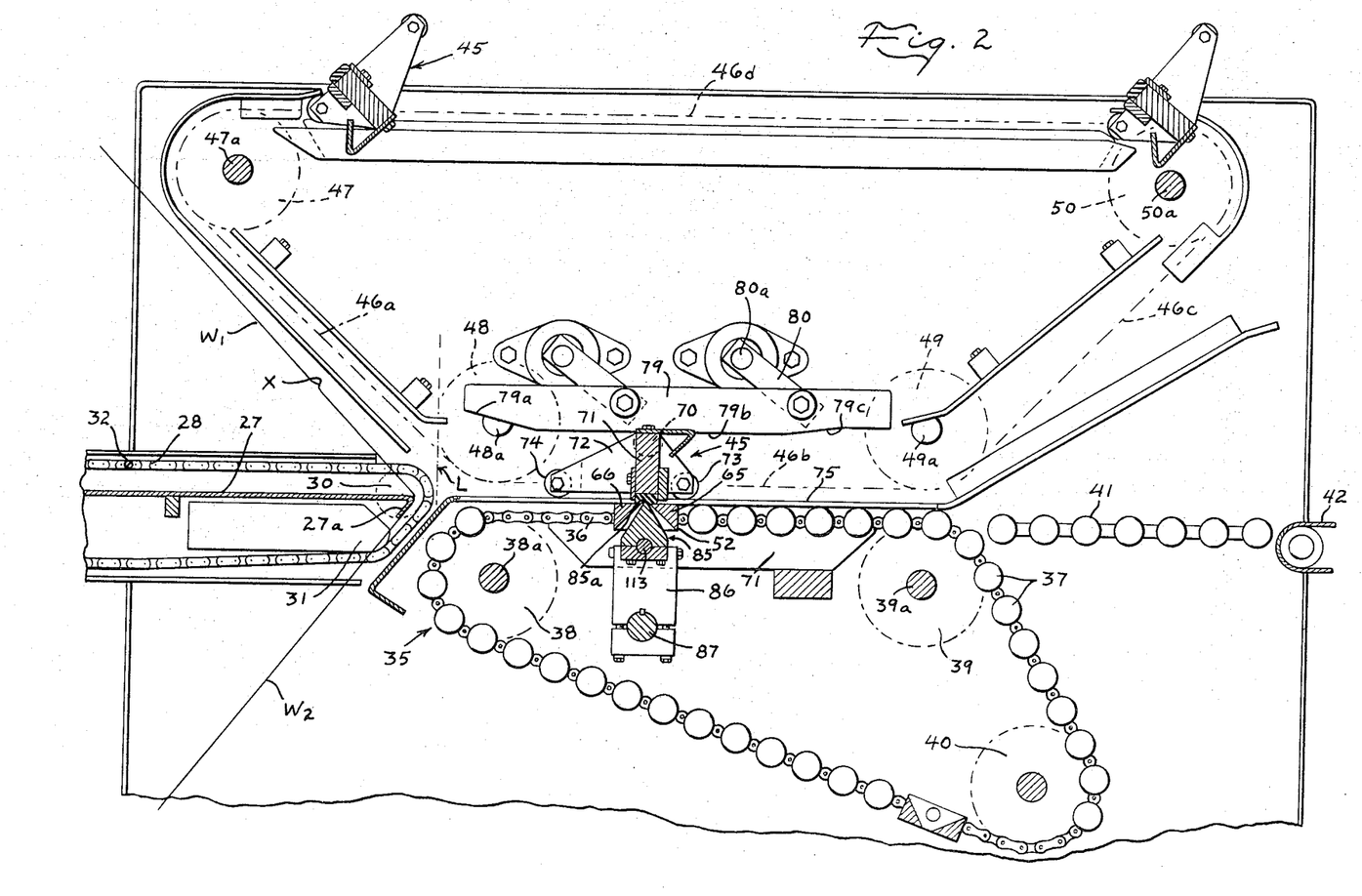
FIG. 2 is a fragmentary longitudinal sectional view through the wrapping machine showing the parts on a larger scale than FIG. 1.

An inlet conveyor or transfer mechanism 26 is arranged to advance articles A in spaced succession along a path into one side of the curtain and until the trail side of the article reaches a preselected location indicated by a point designated L (FIGS. 2 and 4) along the path. As more fully disclosed in the aforementioned U.S. Pat. No. 3,453,801, the inlet conveyor includes a support plate 27, the outlet end 27a of which extends to a point adjacent the location L, and an endless conveyor including a plurality of laterally spaced chains 28 that are entrained about sprockets 29 at the inlet end and over sprockets 30 and guide plates 31 at the outlet end. Article engaging elements or pushers in the form of crossbars 32 extend between the laterally spaced chains 28 to advance articles along the platform. An article support means 35 has its inlet end extending from adjacent the location L forwardly along the article path, and the article support means is constructed and arranged to provide a dwell support for the articles advanced thereon by the inlet conveyor 26. As used herein, the term "dwell support" refers to a support for articles which will support the articles in a substantially stationary position after the inlet conveyor has advanced articles thereon and until the articles are thereafter advanced by the jaw assemblies described hereinafter. In the form shown and as more fully disclosed in the aforementioned patent, the article support means is in the form of a traveling bed of rollers including a pair of laterally spaced lower endless chains 36 having a plurality of rollers 37 extending between the chains and constructed for free axial rotation relative to the chains. As best shown in FIG. 2, chains 36 are entrained about spaced sprockets 38, 39 and 40 which support the upper run of the rollers at a level adjacent the level of the platform 27 of the inlet conveyor. Although the endless chains are themselves driven in a manner and for a purpose described hereinafter, the rollers 37 are free to turn about their own axes so as to effectively avoid propelling or advancing the article support on the upper run thereof. An outlet guide conveniently in the form of a stationary bed of rollers 41 extends from the outlet end of the article support 35 and a means such as a conveyor 42 may be utilized to advance articles from the outlet guide to a shrink tunnel (not shown), if heat shrinkable wrapping material is used.

Figure 1:
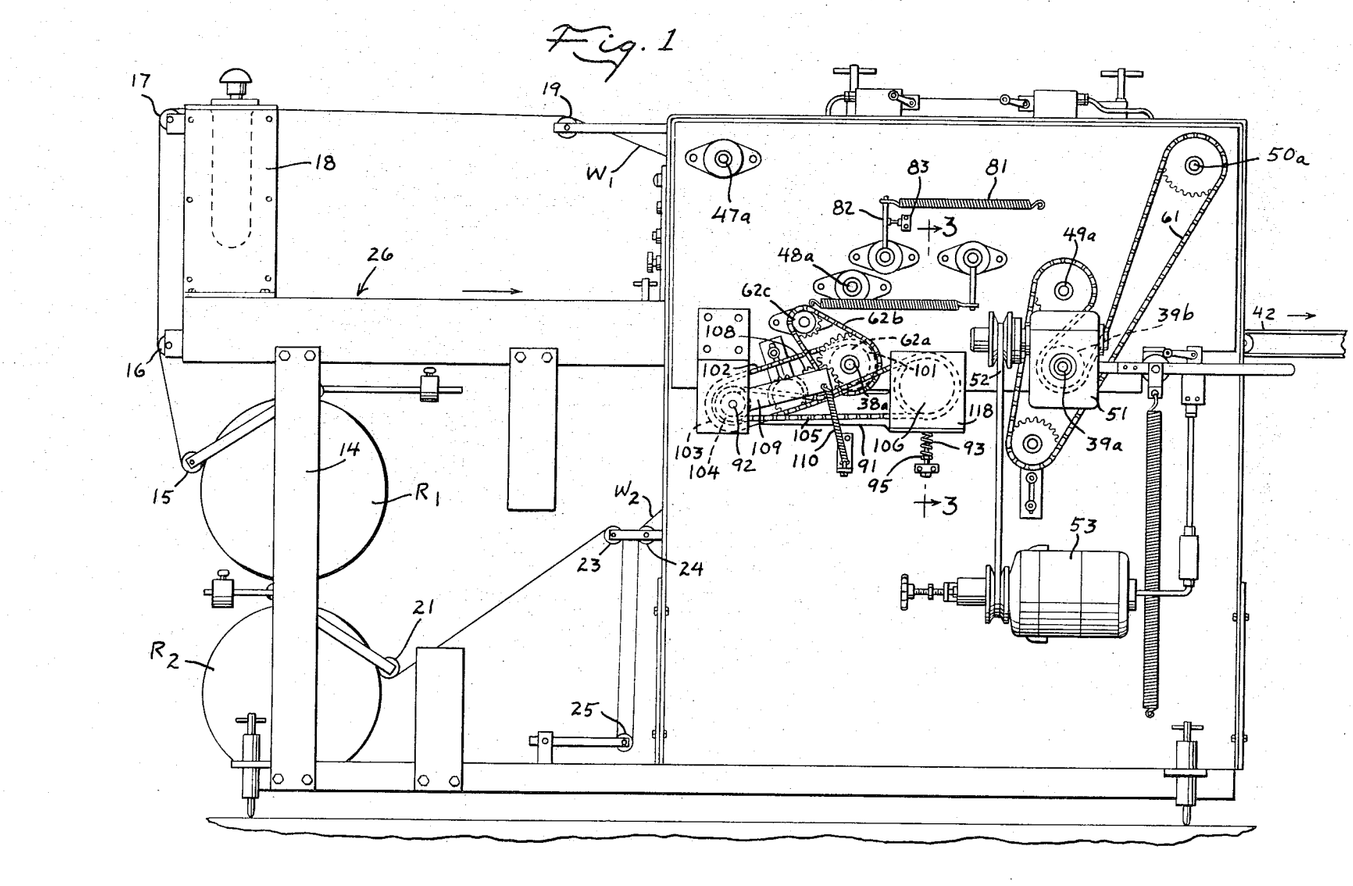
FIG. 1 is a side elevational view of a wrapping machine embodying the present invention.
Figure 4:
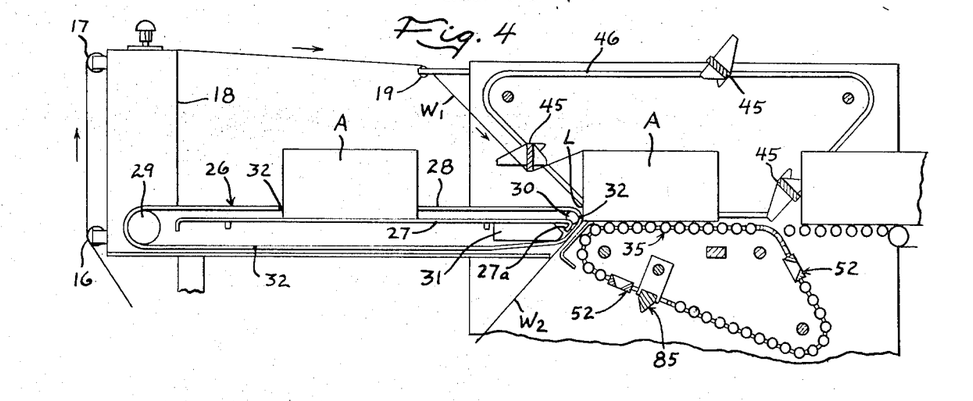
FIGS. 4 and 5 are fragmentary longitudinal sectional views through the wrapping machine showing the same in different moved positions.
Figure 5:
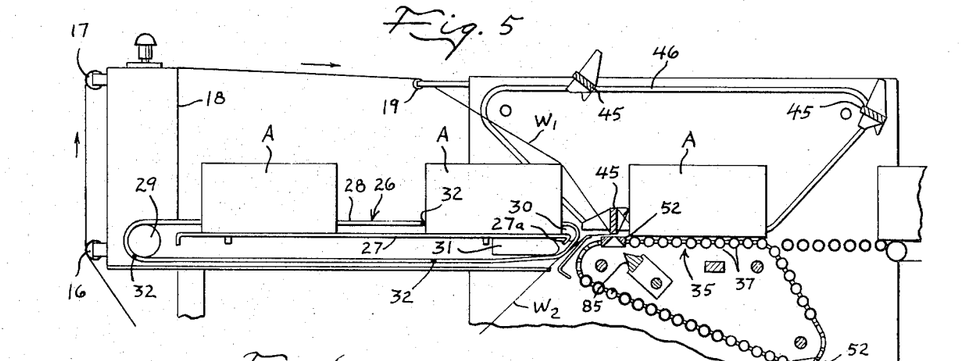

As shown in FIG. 1, the curtain of material formed by the joined webs $W_1$ and $W_2$ extends crosswise of the article path at a location intermediate the inlet conveyor 26 and the article support 35 and adjacent the location L. Articles are advanced by the crossbars 32 on the inlet conveyor in spaced succession into one side of the curtain of wrapping material and onto the article support 35 until the trailing side of the articles reach a position such as shown in FIG. 4 adjacent the location L, at which time the crossbars 32 pass around the sprocket 30 so that they are no longer effective to advance the articles. Advance of the articles is then momentarily interrupted while jaw assemblies at the other side of the curtain move laterally of the article path into positions between the trail side of the article on the support 35 and the lead side of the next succeeding article to draw the curtain of material closely along the trailing side of the article on the support, and to thereafter advance the article along the support by pushing engagement therewith through the curtain.

A plurality of upper jaw assemblies 45, herein shown three in number are mounted for movement in a closed loop course above the article support. The upper jaw assemblies 45 extend between laterally spaced endless jaw conveyors or chains 46 which are entrained over sprockets 47, 48, 49 and 50. As best shown in FIG. 2, and as more fully described in the aforementioned Stohlquist patent, the sprockets 47–50 are arranged so as to define a first run 46a inclined downwardly and forwardly toward the location L; a second or sealing run 46b extending horizontally in a forward direction along the article path above the article support 35; a third run 46c extending upwardly and forwardly away from the article path, and a fourth or return run 46d extending rearwardly back to the first mentioned run. Sprockets 48 and 49 are supported on stub shafts 48a and 49a respectively so as to avoid interference with articles as they advance along the path and sprockets 47 and 50 are nonrotatably connected to cross shafts 47a and 50a respectively to assure driving of the laterally spaced endless chains 46 in unison.

A plurality of lower jaw assemblies, herein shown two in number and designated by the numeral 52, are mounted on endless conveyors or chains, conveniently the same chains 36 which are utilized to support the traveling bed of rollers. The lower jaw assemblies 52 are spaced apart along the chains 36 a distance equal to the spacing of the upper jaw assemblies 45 on the chains 46 and the chains 46 and 36 are driven in continuous fashion and in timed relation with each other such as to bring a lower jaw assembly 52 into opposed relation with an upper jaw assembly 45, as the latter moves along the second or sealing run 46b. Sprockets 38 and 39 are respectively mounted on cross shafts 38a and 39a and, as best shown in FIG. 1, one sprocket such as 39 is driven in continuous fashion preferably through a speed reducer 51 drivingly connected through a variable speed drive mechanism 52 to a drive motor 53. A chain drive 61 drivingly interconnects sprockets on shafts 39a, 49a and 50a to drive the chains 46 and 36 at the same lineal speed, but in relatively opposite directions so that the upper run of chain 36 and the lower run of chain 46 move forwardly in unison along the sealing run. The inlet conveyor 26 is driven in timed relation with the movement of the jaw assemblies and at the same lineal speed as chains 46 and 36, as by a chain drive including sprocket 62a on shaft 38a, chain 62b and sprocket 62c nonrotatably mounted on the same shaft as the inlet conveyor sprocket 30.

Figure 3:
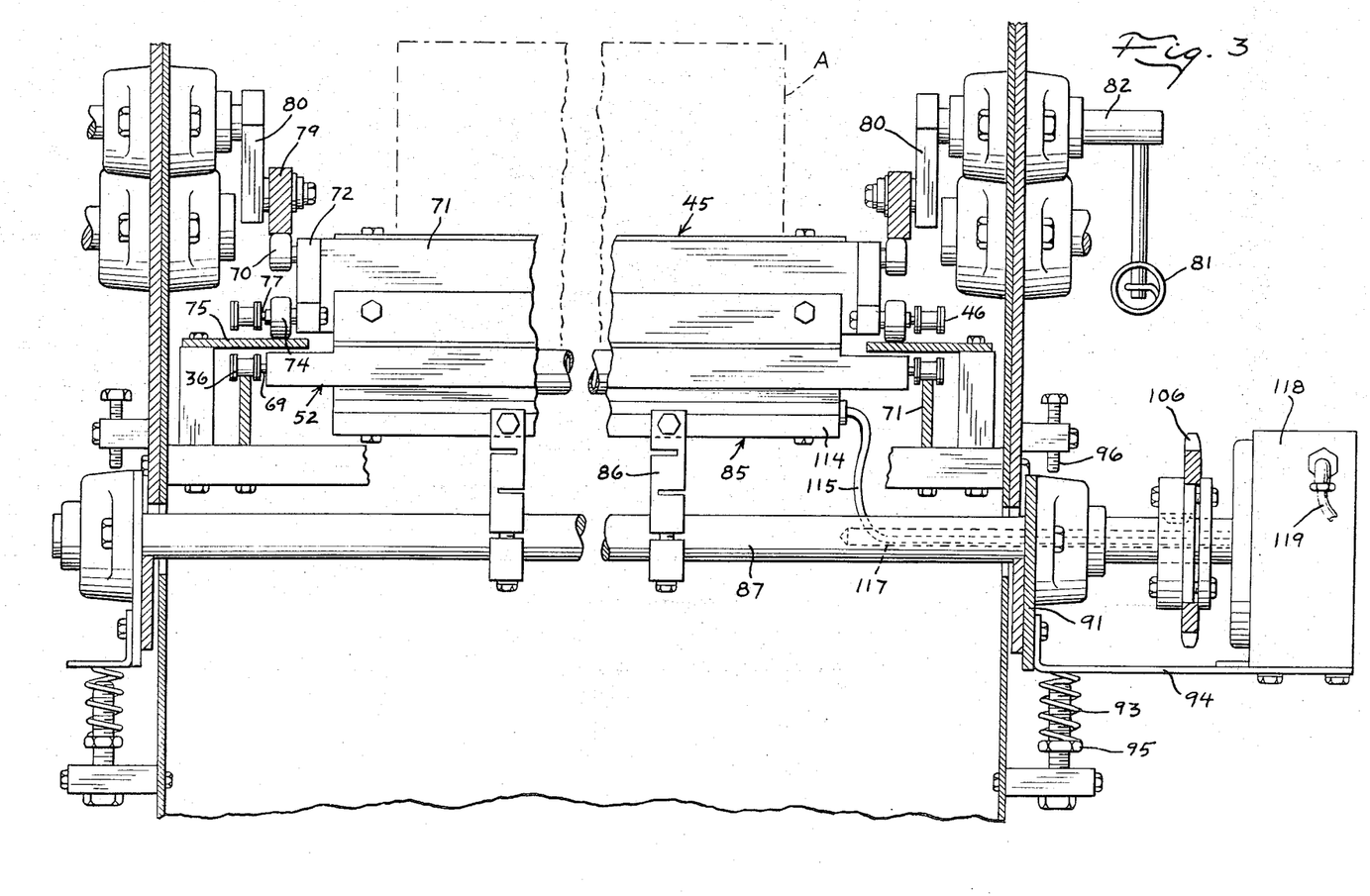
FIG. 3 is a fragmentary transverse sectional view taken on the plane 3—3 of FIG. 1 and showing the parts on a larger scale than FIG. 1.
Figure 6:
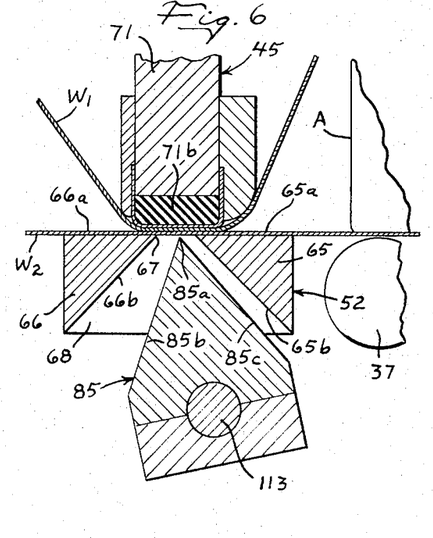
FIGS. 6 and 7 are fragmentary sectional views on an enlarged scale showing the clamping jaw assemblies and the heat sealing and cutting member in different moved positions.

As best shown in FIGS. 2, 4 and 6, the lower sealing jaw assemblies 52 each comprise a pair of clamping jaw members 65 and 66 which extend crosswise between the endless chains 36 and which are spaced apart in a direction lengthwise of the article path to define a jaw opening 67 therebetween. The jaw members 65 and 66 are interconnected at their ends by end members 68 and are supported on the chains by pins 69 which extend laterally inwardly from the chains into sockets in the end members 68. Jaws 65 and 66 have an upper surface 65a, 66a disposed generally coplanar with the tops of the rollers 37 which form the article support. The adjacent faces 65b, 66b of the jaw members 65 and 66 diverge downwardly and outwardly to provide clearance for the heat sealing and cutting member to be described hereinafter. Chains 36 are preferably of the roller type and, as best shown in FIGS. 2 and 3, ride along guide rails 71 during movement along their upper run so as to thereby support the lower jaw assemblies 52 during movement along the sealing run.

The upper jaw assemblies 45 are arranged to clamp overlapping portions of the upper and lower webs $W_1$ and $W_2$ to the spaced jaw members 65 and 66. The upper jaw assembly includes a rigid cross member 71 which extends crosswise of the article path and which has brackets 72 (FIG. 2) at opposite ends. Lead and trail guide rollers 73 and 74 are mounted on the brackets 72 forwardly and rearwardly of the cross member 71 and are arranged for engagement with generally horizontal support rails 75 at opposite sides of the machine to support the upper jaw assembly during movement along the sealing run. The upper jaw assembly is connected to the endless conveyor chains 46 by pins 77 (FIG. 3) preferably coaxial with the rollers 73, so that the upper jaw assemblies are free to swing relative to the chains, as best shown in FIG. 2. The upper jaw assemblies are pressed into contact with the support rails 75 during movement along the sealing run by upper pressure applying rails 79 which are arranged to engage rollers 70 on the ends of the upper jaw assemblies 71, during movement along the sealing run. The pressure applying rails 79 have an inlet cam portion 79a, a dwell portion 79b and an outlet portion 79c where the pressure on the rollers is relieved. The rails are yieldably biased downwardly and, as shown, are supported on arms 80 nonrotatably connected to stub shafts 80a which are yieldably biased by springs 81 and levers 82 (FIG. 1) in a direction to urge the pressure applying rails 79 downwardly. A stop 83 is provided to limit downward movement of the rail.

The upper jaw assemblies 45 are thus arranged to clamp overlapping portions of the upper and lower webs $W_1$ and $W_2$ to the spaced jaw members 65, 66 of the lower jaw assemblies as they move along the sealing run. An electrically heated sealing and cutting member 85 is mounted for movement in a closed loop course that extends generally tangent to the sealing run of the lower jaw assembly in a zone intermediate the ends of the sealing run. In the preferred embodiment illustrated, the heat sealing and cutting member 85 is mounted as by arms 86 on a cross shaft 87, for rotation in a generally circular path tangent to the sealing run at a location intermediate the inlet and outlet sprockets 38 and 39. The heat sealing and cutting member 85 is driven in timed relation with the movement of the jaw conveyors so as to move into the jaw opening 67 between the jaw members on the lower jaw assembly as the lower jaw assembly moves past an intermediate zone, to sever overlapping portions of the web and seal the severed ends of the web. In the form shown wherein the sealing and cutting member is supported for rotation about a shaft 87, the shaft is rotated to complete one revolution of the time required to advance the lower jaw conveyor a distance corresponding to the spacing between adjacent lower jaw assemblies thereon and the movement of the lower jaw assembly is timed so that the position of the sealing and cutting member 85 registers with the jaw opening 67 in the lower jaw assembly as the sealing and cutting member moves past its top dead center position shown in FIG. 2. The sealing and cutting member is rotated in the direction indicated by the arrow in FIG. 2 so that it is travelling in the same direction as the lower jaw assembly as the latter moves along the sealing run and, preferably, the radial position of the sealing and cutting edge 85a of the sealing and cutting member with respect to its shaft 87 is such that the sealing and cutting edge travels in a circular path having a circumferential length corresponding to the spacing between adjacent jaw assemblies on the lower jaw conveyor. With this arrangement, the sealing and cutting edge is traveling at substantially the same speed and in the same direction as the lower jaw assembly, as the sealing and cutting member moves past top dead center. The upper sealing jaw assembly 71 spans the space between the lower clamping jaw members 65 and 66 and is preferably formed with a resilient sealing face 71b so that the sealing and cutting edge 85a on the sealing and cutting member can deform the face 71b after severing the overlapping web portions. The sealing and cutting member has a wedge shaped configuration with the sides 85b, 85c diverging from the radially outer edge 85a. Thus, as the sealing and cutting edge 85a deforms the sealing face 71b on the upper jaw assembly, the sides 85b, 85c of the sealing and cutting member cause the severed ends of the webs to melt back and form a thickened bead somewhat as shown in FIG. 7.

In order to allow time for the severing and sealing operation, particularly at high speeds, the sealing and cutting member is arranged so as to engage the overlapping portions of the web at a location somewhat in advance of top dead center, and to maintain contact with the upper sealing jaw through a substantial arc, for example of the order of 15 to 20° of movement of the sealing and cutting member. For this purpose, the sealing and cutting member is yieldably supported so as to maintain firm contact with the upper sealing jaw, but without causing excessive penetration or pressure on the upper sealing jaw. In the embodiment shown, the shaft 87 for the sealing and cutting member is supported on the outer end of an arm 91 supported for pivotal movement at its remote end on a stub shaft 92. The arm 91 is yieldably biased upwardly by a spring 93 interposed between a bracket 94 on the arm and an adjustable stop 95 on the machine frame (FIGS. 1 and 3) and upward movement of the arm is limited by a stop 96 (FIG. 3). The sealing and cutting member can thus shift downwardly slightly against the bias of the spring 93 as it moves over top dead center to maintain contact with the upper sealing jaw during a finite arc of its movement and without applying excessive upward pressure on the upper sealing jaw. The sealing and cutting member is driven in timed relation with the lower jaw conveyor by a power takeoff from the shaft 38a. As shown in FIG. 1, a sprocket 101 is connected to the lower conveyor shaft 38a and is drivingly connected through a chain 102 to a sprocket 103 on the shaft 92. Sprocket 103 is in turn drivingly connected through a sprocket 104 and chain 105 to a sprocket 106 keyed to the outer end of the shaft 87 for the sealing and cutting member. This arrangement thus effects rotation of the sealing and cutting member in timed relation with the lower jaw conveyor, while yet accommodating limited vertical movement of the sealing and cutting member relative to the lower jaw conveyor. An idler sprocket 108 on an idler arm 109 is yieldably biased by a spring 110 into engagement with the chain 105 to maintain chain tension.

Figure 7:
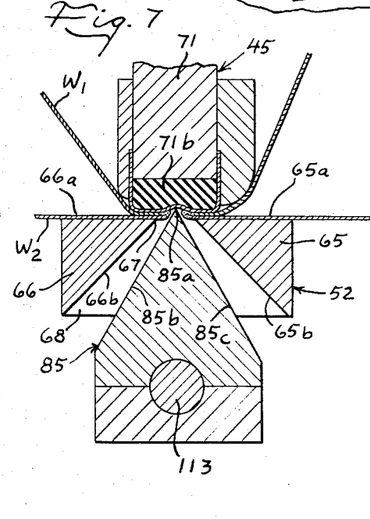

The heat sealing and cutting member 85 is formed of a heat conducting metal and heated by an electrically energized heater 113 conveniently mounted on the member 85 by a clamp plate 114 (FIGS. 6 and 7). As shown in FIG. 3, a heater 113 is connected by conductors 115 that extend through a hollow passage 117 in shaft 87 to a brush and slip ring assembly 118 mounted on the bracket 94 at the outer end of shaft 87, and power is supplied from a source (not shown) through conductors 119 to the brush and slip ring assembly. An adjustable temperature responsive switch, not shown, can be provided for controlling energization of the heater 113 for the heat sealing and cutting member to maintain the temperature of the sealing and cutting member at the desired value for severing and sealing the thermoplastic webs of wrapping material.

From the foregoing it is thought that the construction and operation of the wrapping apparatus will be readily understood. Articles A are advanced by the inlet conveyor 28 onto the article support until the trail side of the articles reaches a position L adjacent the inlet end of the article support, and the upper and lower jaw conveyors are driven in timed relation with the inlet conveyor so as to move the upper and lower jaw assemblies into a position at the trail side of the article to advance the article by pushing engagement therewith through the curtain as the jaw assemblies move along the sealing run. The upper jaw assemblies are cammed downward by cam portions 79a on rails 79 to clamp overlapping portions of the web to the lower jaw member and the upper jaw assemblies are maintained in clamping engagement with the lower jaw members by the dwell portion 79b on rail 79 during movement along the sealing run. The sealing and cutting member 85 is moved in a closed loop path tangent to the sealing run sequentially into the jaw opening 67 to sever and seal overlapping portions of the web and then out of the jaw opening to allow the sealed ends of the web to cool. The sealing and cutting member 85 is heated by an electrical heater element 113 which is preferably continuously energized from a power supply (not shown) connected through the brush and slip ring assembly 118 at the end of the shaft 83. The sealing and cutting member is preferably formed so as to have a relatively large mass to maintain a substantially uniform temperature during the sealing and cutting operation and the temperature of the sealing and cutting member can be automatically controlled at the desired value by a temperature responsive switch assembly (not shown) which responds to the temperature of the sealing and cutting member.

Since the sealing and cutting member moves into and out of the lower jaw assembly during a relatively short portion of the overall cycle, the lower jaw assembly does not get heated appreciably by the sealing and cutting member and is thus operative to effect cooling of the heat seal joint between the webs. In addition, since the sealing and cutting member moves into and out of a lower sealing jaw assembly, it is not necessary to intermittently energize and deenergize the sealing and cutting member during each cycle and the latter can, instead, be continuously energized. This, in turn, simplifies the controls for energizing the sealing and cutting member.

The embodiments of the invention in which an exclusive property or privilege is claimed are defined as follows:

1. In an apparatus for wrapping articles in heat sealable sheet material as they move along an article path including upper and lower endless jaw conveyor means respectively having at least one upper and one lower jaw assembly extending generally horizontally crosswise of the article path, said path and lower endless conveyor means respectively having generally horizontal lower and upper sections thereof extending forwardly along the article path in a sealing run in which one upper and one lower jaw assembly move in an opposed pair along the sealing run, means for supporting end sections of upper and lower webs respectively above and below the article path, the ends of which webs have previously been joined to form a curtain of the material extending crosswise of the article path adjacent the inlet end of said sealing run, means for advancing an article along the article path into the curtain to draw the curtain along the top and bottom of the article and to position the article in front of an opposed pair of said jaw assemblies as they move toward the inlet end of said sealing run, the improvement wherein said lower jaw assembly includes a pair of lower clamping jaw members extending crosswise of the article path and spaced apart in a direction lengthwise of the article path to define a jaw opening therebetween, means for guiding said upper and lower jaw assemblies as they move along the sealing run with an upper jaw assembly clamping overlapping portions of the upper and lower webs to the pair of lower clamping jaw members on a lower jaw assembly, a generally horizontal heat sealing and cutting member extending crosswise of said article path and mounted for movement in a closed loop course extending generally tangent to said upper section of said lower conveyor means in a zone intermediate the ends of said sealing run, and means for driving said sealing and cutting member in timed relation with said lower conveyor means along said closed loop course sequentially into the jaw opening in said lower jaw assembly as it moves past said intermediate zone to sever and seal overlapping portions of the upper and lower webs at opposite sides of the severance and then out of said lower jaw opening before the upper and lower jaw assemblies reach the end of the sealing run to allow the sealed webs to cool.

2. An apparatus for wrapping articles according to claim 1 wherein said heat sealing and cutting member is rotatably supported for movement in a circular path generally tangent to said sealing run.

3. An apparatus for wrapping articles according to claim 1 wherein said heat sealing and cutting member is rotatably supported on generally horizontal shaft means extending crosswise of said article path, means supporting said shaft means for limited vertical shifting movement, and means yieldably biasing said shaft means upwardly to yieldably urge said heat sealing and cutting member to a level slightly above said pair of clamping jaws on the lower jaw assembly.

4. An apparatus for wrapping articles according to claim 1 wherein said upper jaw assembly includes a face portion adapted to span said jaw opening in the lower jaw assembly as said upper and lower jaw assemblies moves along said sealing run, said heat sealing and cutting member pressing the overlapping portions of the upper and lower webs against said face portion on the upper jaw assembly during severing of the overlapping portion of the webs.

5. An apparatus according to claim 4 wherein said face portion is of resilient and deformable material.

6. An apparatus for wrapping articles according to claim 4 wherein said heat sealing and cutting member is rotatably supported on generally horizontal shaft means extending crosswise of said article path, means supporting said shaft means for limited vertical shifting movement, and means yieldably biasing said shaft means upwardly to yieldably urge said heat sealing and cutting member to a level slightly above said pair of clamping jaws on the lower jaw assembly.

7. An apparatus for wrapping articles according to claim 6 wherein said face portion is resilient.

8. In an apparatus for wrapping articles in heat sealable sheet material as they move along an article path including upper and lower endless jaw conveyor means respectively having at least one upper and one lower jaw assembly spaced therealong and extending generally horizontally crosswise of the article path, said upper and lower endless conveyor means respectively having generally horizontal lower and upper sections thereof extending forwardly along the article path in a sealing run in which one upper and one lower jaw assembly move in opposed pairs along the sealing run, means for supporting end sections of upper and lower webs respectively above and below the article path, the ends of which webs have previously been joined to form a curtain of the material extending crosswise of the article path adjacent the inlet end of said sealing run, means for advancing an article along the article path into the curtain to draw the curtain along the top and bottom of the article and to position the article in front of a pair of said jaw assemblies as they move toward the inlet end of said sealing run, the improvement wherein said lower jaw assembly includes a pair of lower clamping jaw members extending crosswise of the article path and spaced apart in a direction lengthwise of the article path to define a jaw opening therebetween, means for guiding said upper and lower jaw assemblies as they move along the sealing run with an upper jaw assembly clamping overlapping portions of the upper and lower webs to the pair of lower clamping jaw members of a lower jaw assembly, a generally horizontal heat sealing and cutting member extending crosswise of said article path and mounted on shaft means for rotation about an axis paralleling said heat sealing and cutting member for movement in a closed loop course extending generally tangent to said upper section of the lower conveyor means in a zone intermediate the ends of said sealing run, and means for rotating said sealing and cutting member in timed relation with said lower conveyor means along said closed loop course sequentially into the jaw opening in said lower jaw assembly as it moves past said intermediate zone to sever and seal overlapping portions of the upper and lower webs at opposite sides of the severance and then out of said lower jaw opening before the upper and lower jaw assemblies reach the end of the sealing run to allow the sealed webs to cool.

9. An apparatus for wrapping articles according to claim 8 wherein said clamping jaw members of the lower jaw assembly have upper faces cooperable with an upper jaw assembly to clamp overlapping portions of the web therebetween and adjacent side faces which diverge outwardly from the adjacent edges of said upper faces whereby said jaw opening is relatively narrow adjacent said upper faces and increases in width in a direction away from said upper faces of the lower jaw member to facilitate movement of the sealing and cutting member into and out of said jaw opening.

10. An apparatus for wrapping articles according to claim 8 wherein said upper jaw assembly has a resilient portion spanning the space between the lower jaw members of a lower jaw assembly during movement along the sealing run.

11. An apparatus for wrapping articles according to claim 10 wherein said sealing and cutting member has a generally wedge shaped cross-section providing a relatively sharp sealing and cutting edge at its radially outer edge.

12. An apparatus for wrapping articles according to claim 10 wherein said shaft means is supported for limited vertical movement, and means yieldably biasing said shaft means upwardly to a level slightly above the level of said clamping jaw members on said lower jaw assemblies.

13. An apparatus for wrapping articles according to claim 8 wherein upper and lower conveyors respectively have at least two of said upper and lower jaw assemblies spaced therealong and said sealing and cutting member has a radially outer edge spaced from the axis of said shaft means a distance such that said closed loop course has a length approximating the spacing between adjacent lower jaw assemblies on the lower conveyor means.

14. An apparatus according to claim 8 including a plurality of article support rollers on said lower conveyor means intermediate adjacent ones of said lower jaw assemblies.

* * * * *

PO-1050
(5/69)

UNITED STATES PATENT OFFICE
CERTIFICATE OF CORRECTION

Patent No. 3,782,072      Dated January 1, 1974

Inventor(s) R. P. Sorensen and Leo Strombeck

It is certified that error appears in the above-identified patent and that said Letters Patent are hereby corrected as shown below:

Column 8, line 31, "path (second occurrence) should be --upper--.

Signed and sealed this 7th day of May 1974.

(SEAL)
Attest:

EDWARD M.FLETCHER,JR.
Attesting Officer

C. MARSHALL DANN
Commissioner of Patents